US012088752B1

(12) United States Patent
Liu

(10) Patent No.: US 12,088,752 B1
(45) Date of Patent: Sep. 10, 2024

(54) MULTI-FUNCTIONAL MOBILE PHONE HOLDER

(71) Applicant: DONGGUAN DONGDINGYUN TECHNOLOGY CO., LTD., Dongguan (CN)

(72) Inventor: Xiuxi Liu, Dongguan (CN)

(73) Assignee: DONGGUAN DONGDINGYUN TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/596,811

(22) Filed: Mar. 6, 2024

Related U.S. Application Data

(63) Continuation of application No. PCT/CN2024/070589, filed on Jan. 4, 2024.

(30) Foreign Application Priority Data

Jun. 9, 2023 (CN) .......................... 202321457083.8
Nov. 1, 2023 (CN) .......................... 202322948979.2

(51) Int. Cl.
*H04M 1/04* (2006.01)
(52) U.S. Cl.
CPC ..................................... *H04M 1/04* (2013.01)
(58) Field of Classification Search
CPC ....................................................... H04M 1/04
See application file for complete search history.

(56) References Cited

U.S. PATENT DOCUMENTS

| 11,786,031 | B1 * | 10/2023 | Backus | ................ | G06F 1/1626 |
| | | | | | 224/577 |
| 11,985,264 | B1 * | 5/2024 | Han | ...................... | F16M 11/38 |
| 2021/0324994 | A1 * | 10/2021 | Liu | ........................ | F16M 11/38 |
| 2022/0159113 | A1 * | 5/2022 | Parish, Sr. | ............. | H04M 1/04 |
| 2023/0033640 | A1 * | 2/2023 | Kim | ....................... | H04M 1/04 |

(Continued)

FOREIGN PATENT DOCUMENTS

| CN | 208509014 U | 2/2019 |
| KR | 1020230016846 A | 2/2023 |

OTHER PUBLICATIONS

Claims of PCT/CN2024/070589.
CNIPA (ISA), Written Opinion from an International Searching Authority for PCT/CN2024/070589, Mar. 21, 2024.

*Primary Examiner* — Md K Talukder
(74) *Attorney, Agent, or Firm* — Jeenam Park

(57) ABSTRACT

Disclosed is a multi-functional mobile phone holder, including a placing portion and a supporting portion rotationally connected to the supporting portion, where the supporting portion includes a main supporting plate, a left supporting plate and a right supporting plate, the main supporting plate is provided with a first main inclined surface and a second main inclined surface, the left supporting plate is provided with a left inclined surface, and the right supporting plate is provided with a right inclined surface; and the left supporting plate rotates with an axis P1 perpendicular to the first main inclined surface as a rotation axis, and the right supporting plate rotates by a certain angle with an axis P2 perpendicular to the second main inclined surface as a rotation axis, such that the main, left and right supporting plates are separated from each other two by two to support the placing portion.

8 Claims, 14 Drawing Sheets

(56) References Cited

U.S. PATENT DOCUMENTS

| | | | |
|---|---|---|---|
| 2023/0196787 A1* | 6/2023 | Agrawal | G06V 20/58 |
| | | | 382/103 |
| 2023/0261359 A1* | 8/2023 | Lebovitz | H01Q 21/28 |
| | | | 343/720 |
| 2024/0067102 A1* | 2/2024 | Iverson | B60R 11/0241 |

* cited by examiner

MULTI-FUNCTIONAL MOBILE PHONE HOLDER

TECHNICAL FIELD

The present disclosure relates to the technical field of product processing, and particularly relates to a multi-functional mobile phone holder.

BACKGROUND ART

A mobile phone is a portable telephone terminal and is an indispensable tool in modern life. When people use their mobile phones to watch videos or make video calls, holding the mobile phones for a long period of time is easy to cause hand fatigue and discomfort, therefore, mobile phone holders come into being and can be used for placing the mobile phones and releasing people's hands, greatly facilitating people's lives.

However, the current mobile phone holders, such as the one disclosed in a patent numbered CN107483689A, as shown in FIG. 1, usually includes a base plate 1', a supporting plate 2' pivotally connected to the base plate 1', a placing plate 3', and a blocking plate 4'. When the holder is in use, the upper end of the supporting plate 2' abuts against the placing plate 3'. During slight shaking, the supporting plate 2' is prone to slide away from the original supporting position of the placing plate 3' and fall to the base plate 1', resulting in poor fixation. In addition, the complex structural design makes the mobile phone holders generally larger and bulkier. Although the stability of the holder is improved to some extent, it is inconvenient for handheld use or portable storage in a pocket.

SUMMARY

(1) Technical problem to be solved

In view of defects in the prior art, the present disclosure aims to provide a multi-functional mobile phone holder, aiming to solve the technical problems of the prior art that the holder has poor fixing effect and is large and bulky in size, and inconvenient for storage.

(2) Technical Solution

A multi-functional mobile phone holder, including a placing portion and a supporting portion, where the placing portion is rotationally connected to the supporting portion, the supporting portion includes a main supporting plate, a left supporting plate and a right supporting plate, the main supporting plate is provided with a first main inclined surface and a second main inclined surface, the left supporting plate is provided with a left inclined surface, and the right supporting plate is provided with a right inclined surface; the left supporting plate rotates with an axis P1 perpendicular to the first main inclined surface as a rotation axis, and the right supporting plate rotates by a certain angle with an axis P2 perpendicular to the second main inclined surface as a rotation axis, such that the main supporting plate, the left supporting plate and the right supporting plate are separated from each other two by two to support the placing portion.

Further, the placing portion is provided with an accommodating groove formed with an internal recess, and a through hole penetrating through the placing portion is formed on the placing portion.

Further, one end of the main supporting plate extends to form a connecting block, a placement hole with a size same as that of the connecting block is formed on a bottom of the placing portion, two sides of the placement hole are each provided with a third main connecting hole, a fourth main connecting hole corresponding to the position of the third main connecting hole is formed on the connecting block, and one side of the main supporting plate is provided with a main shaft and a main resistance sleeve;

a first left connecting hole is formed on the first main inclined surface, a second left connecting hole is formed on the left inclined surface, a left shaft and a left resistance sleeve are arranged between the first left connecting hole and the second left connecting hole; and a first right connecting hole is formed on the second main inclined surface, a second right connecting hole is formed on the right inclined surface, and a right shaft and a right resistance sleeve are arranged between the first right connecting hole and the second right connecting hole.

Further, a left limiting block is arranged on the left inclined surface, and the first left connecting hole is provided with a semicircular arc-shaped left limiting ring groove; and a right limiting block is arranged on the right inclined surface, and the first right connecting hole is provided with a semicircular arc-shaped right limiting ring groove.

Further, an arc-shaped inclined groove is formed on the accommodating groove.

Further, a cover plate is arranged on the placing portion, a connecting portion is connected between the placing portion and the cover plate, one end of the connecting portion is connected to the placing portion, and the other end thereof is connected to the cover plate;

when the cover plate is opened, one end of the connecting portion is connected to the placing portion, the other end is connected to the cover plate, in such case, the connecting portion is horizontally unfolded and located between the placing portion and the cover plate, such that the holder can be grasped more firmly; and when the cover plate is stored, the connecting portion is vertically folded between the placing portion and the cover plate, and the cover plate, the connecting portion and the placing portion are closely together, such that the holder is easy to be stored.

Further, an inwardly recessed groove is formed on the cover plate, where the groove corresponds to the position of the connecting portion being stored, and a depth of the groove is greater than a thickness of the connecting portion.

Further, one or more first magnetic attraction members are arranged between the edge of the groove and the edge of the cover plate, and a second magnetic attraction member corresponding to the position of the first magnetic attraction member is arranged on the placing portion; and under the action of the magnetic force of the first magnetic attraction member and the second magnetic attraction member, the cover plate and the placing portion are both kept in a stored state.

Further, a placing position for accommodating the cover plate is arranged at the position where the placing portion is in perfect fit with the cover plate, the placing position and a lower part of the placing portion form a step, and a thickness of the step is the same as a thickness of the cover plate.

Further, when the connecting portion is made of soft material, two ends of the connecting portion are fixedly connected to the placing portion and the cover plate, respectively; and when the connecting portion is made of hard material, two ends of the connecting portion are respectively hinged with the placing portion and the cover plate.

(3) Beneficial Effects

Compared with the prior art, the present disclosure has the following beneficial effects:

1. In the present disclosure, the left supporting plate rotates with an axis P1 perpendicular to the first main inclined surface as a rotation axis, and the right supporting plate rotates by a certain angle with an axis P2 perpendicular to the second main inclined surface as a rotation axis, such that the main supporting plate, the left supporting plate and the right supporting plate are separated from each other two by two to form a triangular pyramid shape to support the placing portion, in such case, the supporting portion in the shape of a triangular pyramid shape has both grip force and supporting force, and the placing portion serves as a back supporting an electronic device and can be adjusted at multiple angles with the supporting portion, so as to improve the stability during use, optimize the use of components and reduce the production costs.
2. In the present disclosure, the supporting portion and the placing portion are folded, such that the overall space occupied by the holder is optimized, and the appearance of the holder becomes exquisite and compact, making the holder convenient to be stored in a pocket and to be carried during traveling, and difficult to be lost; and the fixing part is provided with a magnetic attraction part, and the magnetic attraction part enables the back of the electronic device to be stably fixed onto the placing portion, such that the stability of the electronic device is enhanced.
3. In the present disclosure, by folding and unfolding the connecting portion in horizontal and vertical directions, and using the hidden design of the connecting portion stored in the groove when being folded, the holder can be grasped more firmly, and the convenience of storage is improved.

Figure 1:
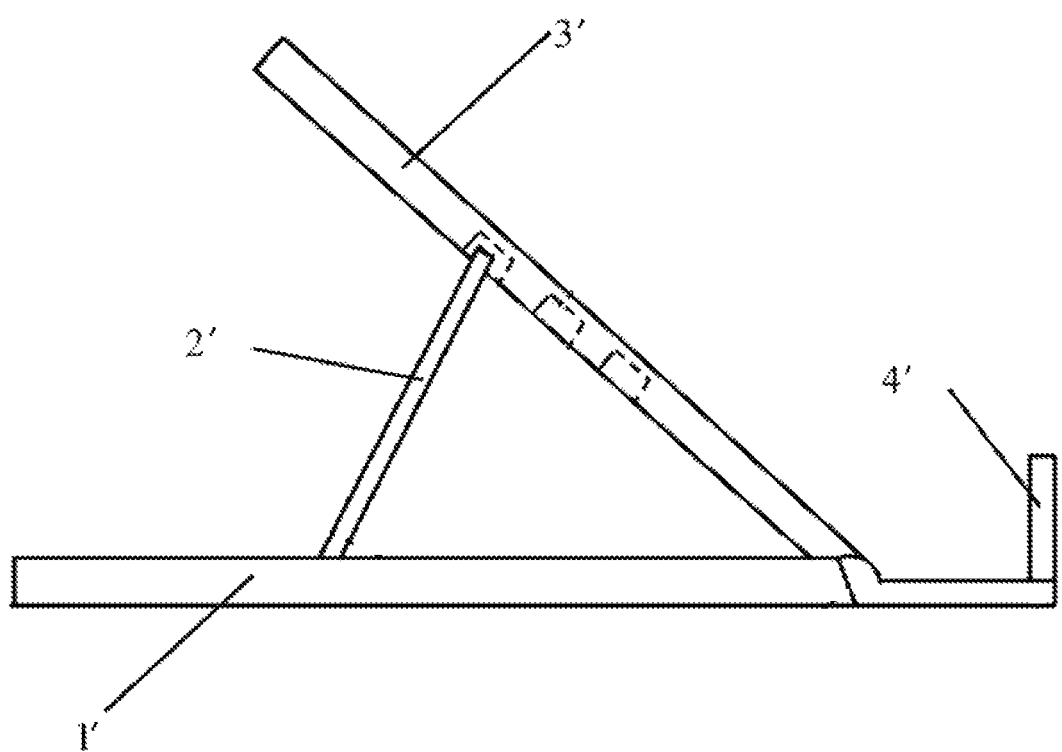
FIG. 1 is a structural schematic diagram of a mobile phone holder in the prior art.
Figure 2:
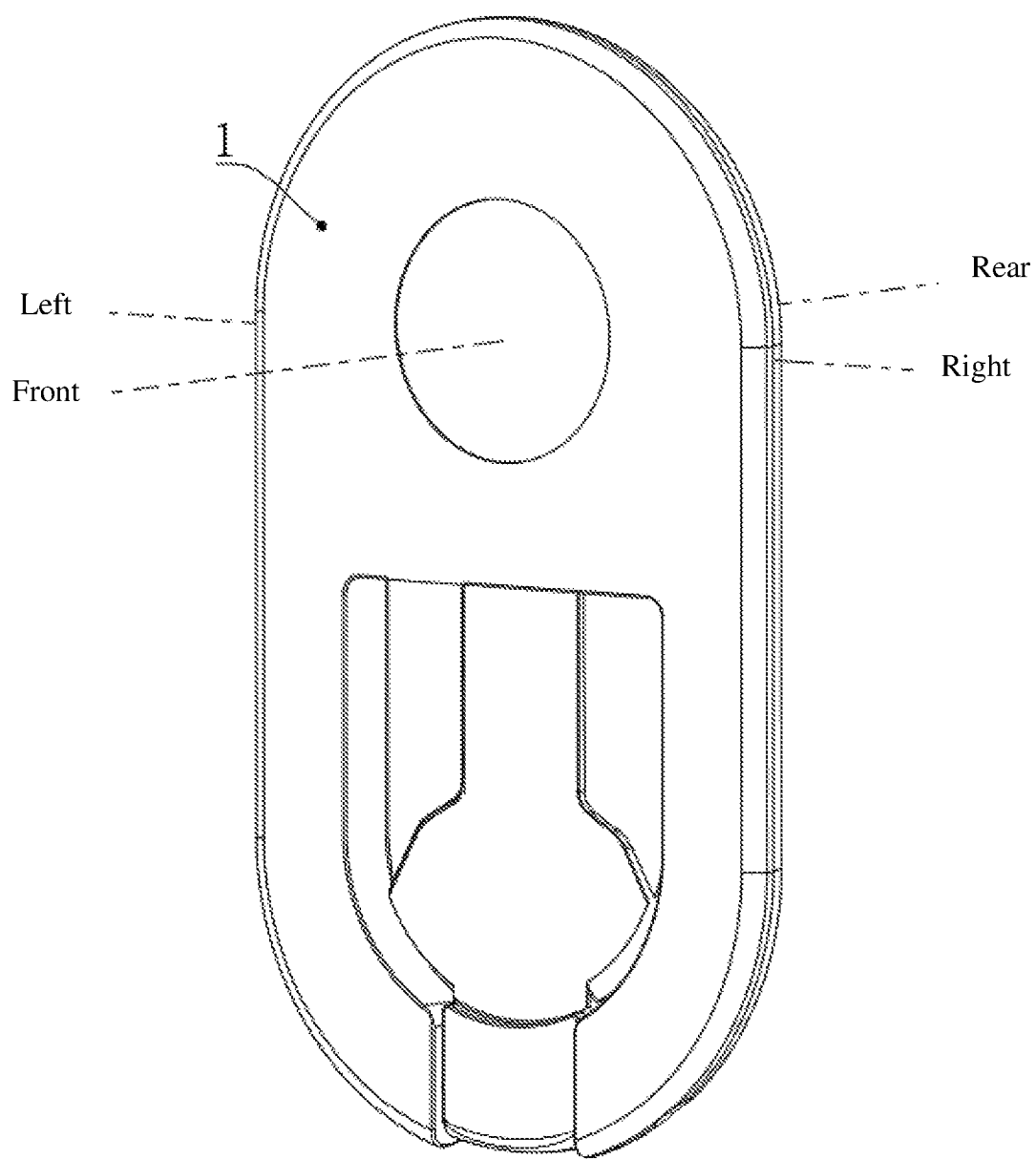
FIG. 2 is a three-dimensional structure diagram 1 when a holder in the present disclosure is folded.
Figure 3:
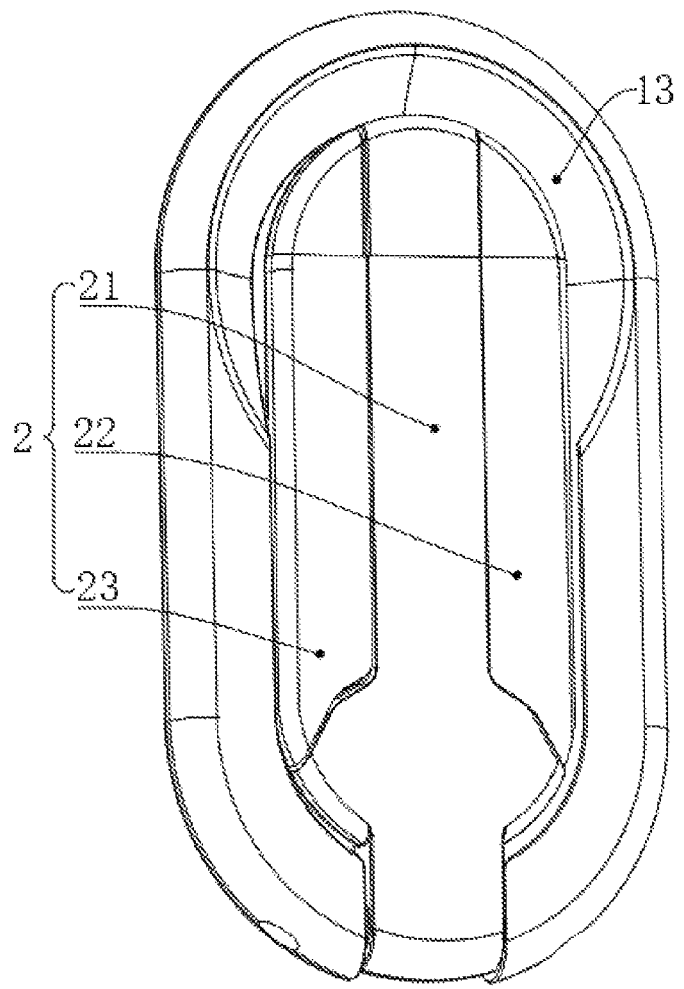
FIG. 3 is a three-dimensional structure diagram 2 when a holder in the present disclosure is folded.
Figure 4:
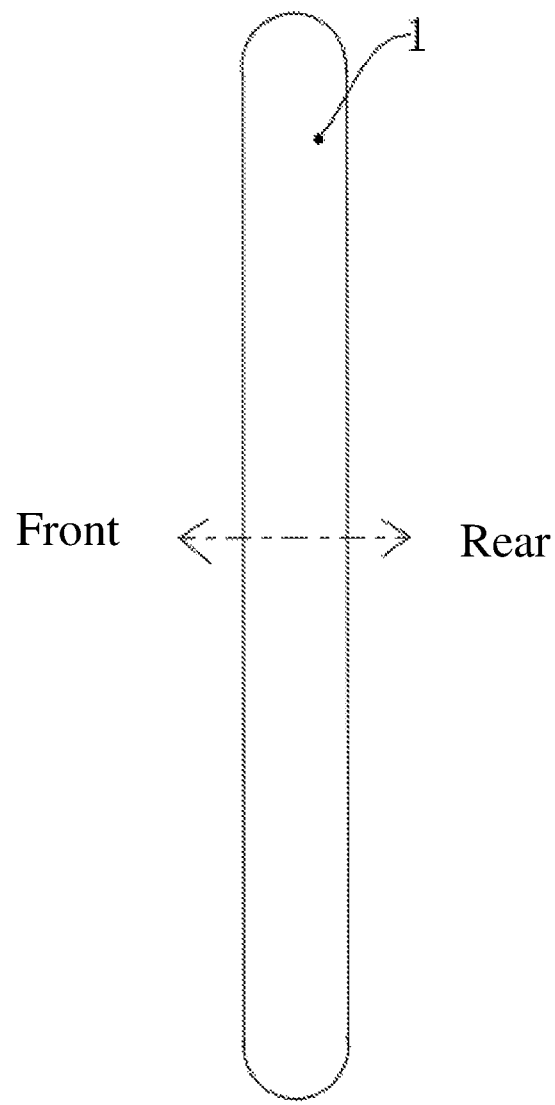
FIG. 4 is a right view when a holder in the present disclosure is folded.
Figure 5:
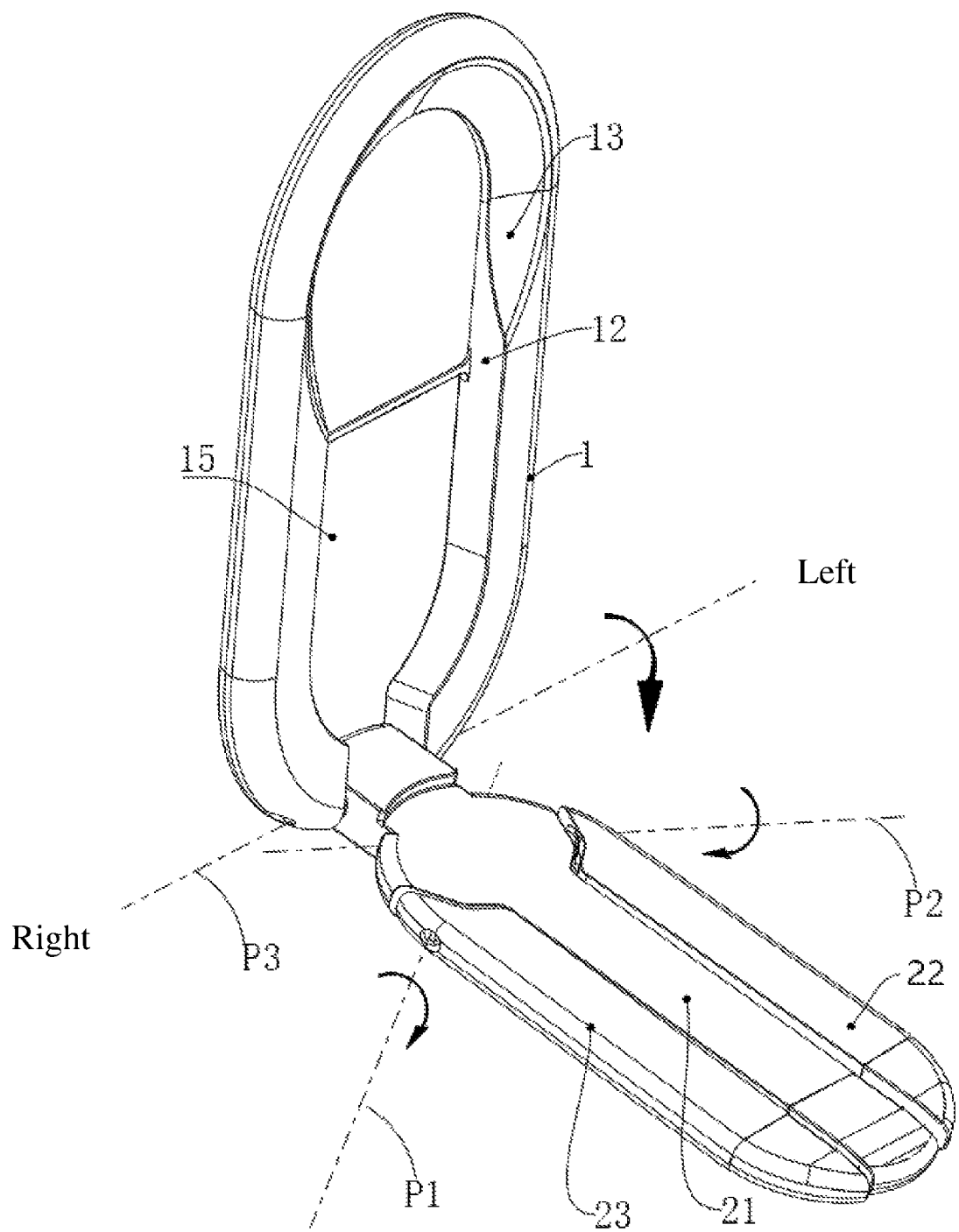
FIG. 5 is a three-dimensional structure diagram when a supporting portion according to the present disclosure has been rotated out from an accommodating groove.
Figure 6:
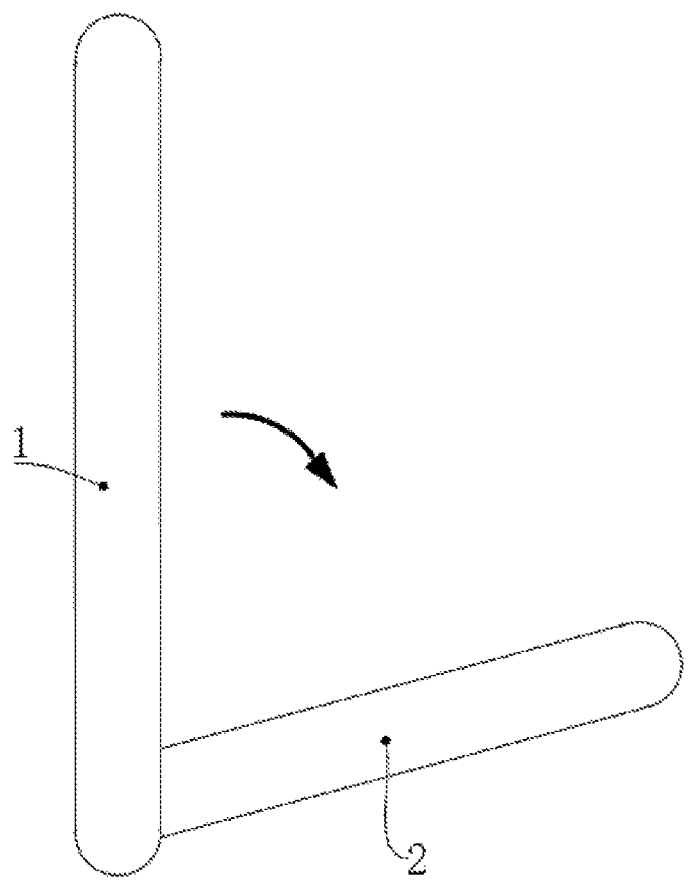
FIG. 6 is a three-dimensional structure diagram when a supporting portion according to the present disclosure is rotating out from an accommodating groove.
Figure 7:
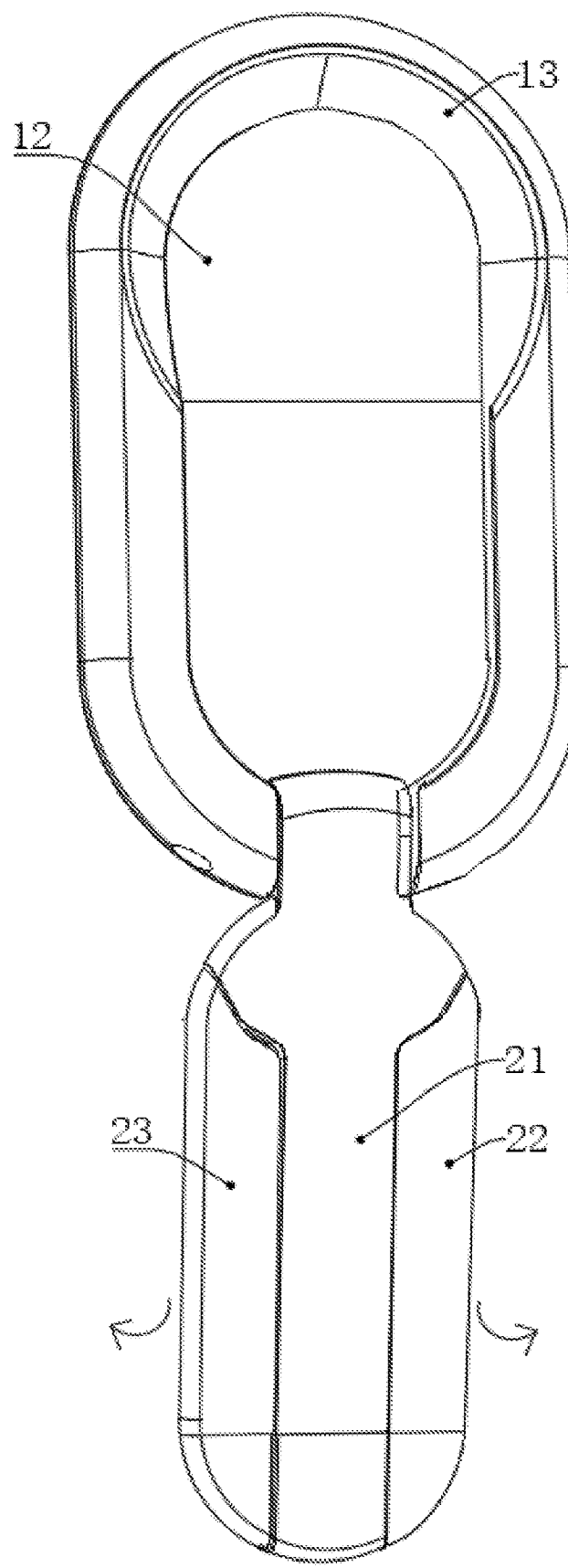
FIG. 7 is a three-dimensional structure diagram when a holder in the present disclosure is unfolded.
Figure 8:
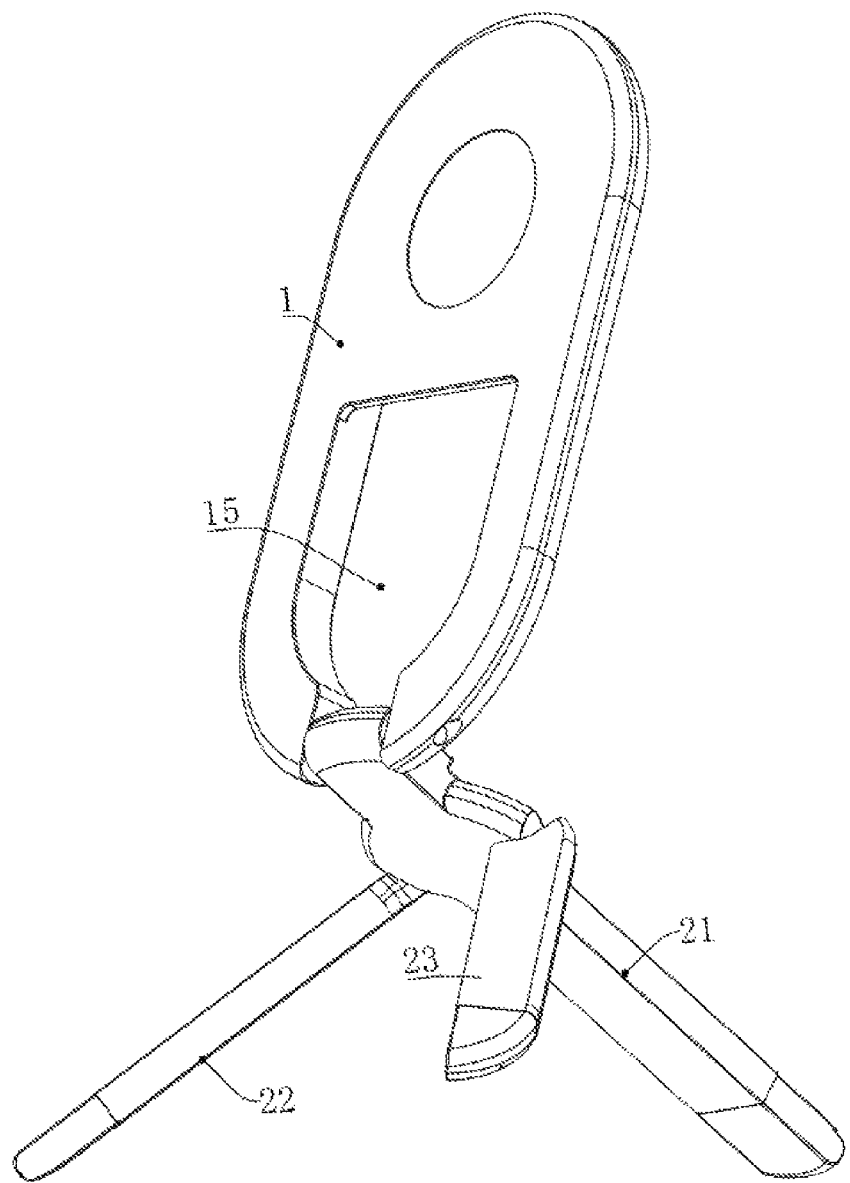
FIG. 8 is a three-dimensional structure diagram when a supporting portion according to the present disclosure is in a shape of triangular pyramid.
Figure 9:
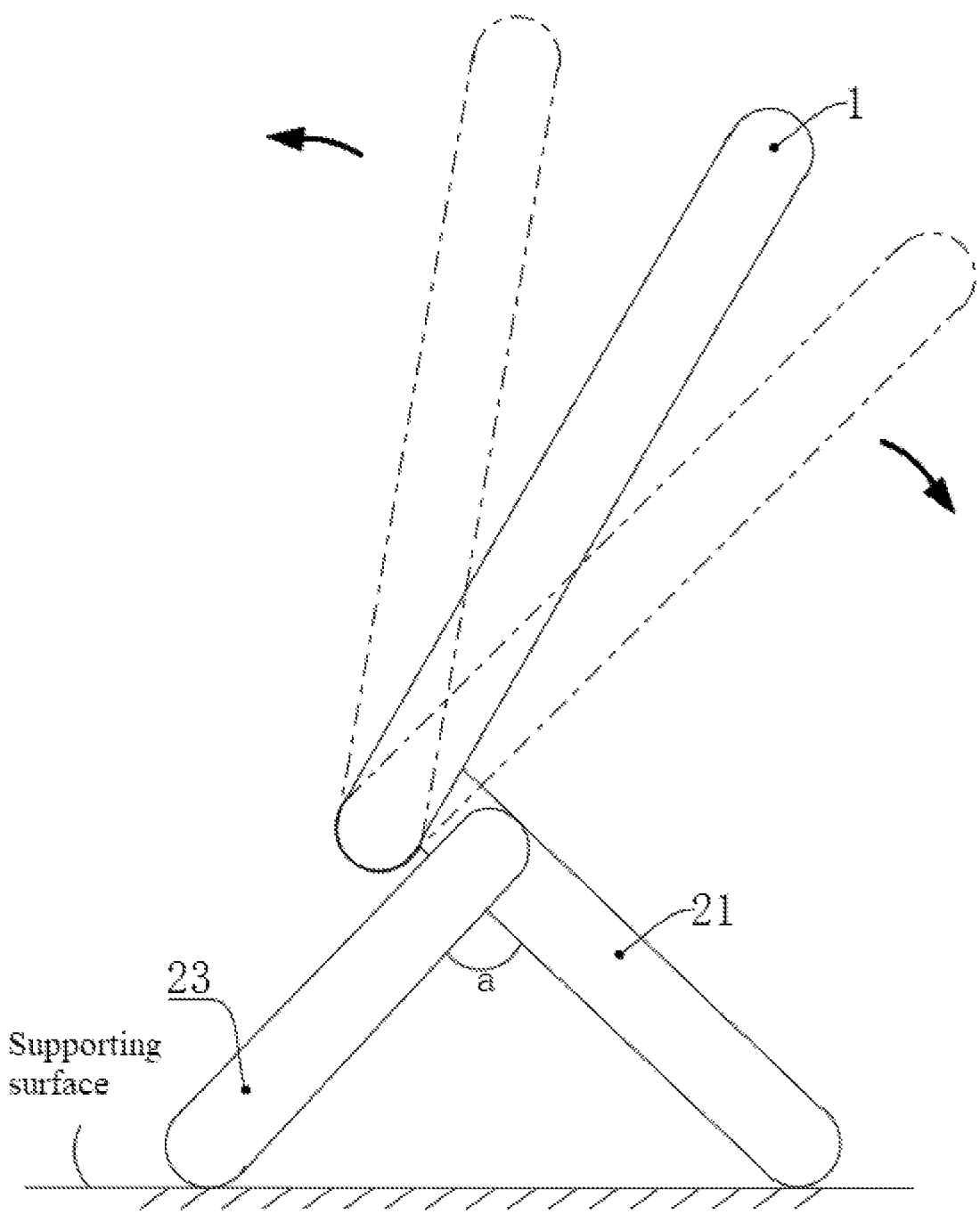
FIG. 9 is a schematic diagram of angular action when a holder is unfolded and positioned on a supporting surface to adjust a placing portion.

Reference numerals in the drawings: 1-placing portion; 11-magnetic attraction part; 12-accommodating groove; 13-arc-shaped inclined groove; 14-placement hole; 141-third main connecting hole; 15-through hole; 16-placing position; 17-step; 2-supporting portion; 21-main supporting plate; 211-first main inclined surface; 212-second main inclined surface; 213-connecting block; 214-fourth main connecting hole; 215-first left connecting hole; 216-first right connecting hole; 217-left limiting ring groove; 218-right limiting ring groove; 22-left supporting plate; 221-left inclined surface; 222-second left connecting hole; 223-left limiting block; 23-right supporting plate; 231-right inclined surface; 232-second right connecting hole; 233-right limiting block; 24-main shaft; 25-main resistance sleeve; 26-left shaft; 27-left resistance sleeve; 28-right shaft; 29-right resistance sleeve; 30-sharp corner; 31-rubber sleeve; 4-cover plate; 41-cover head; 42-cover arm; 43-groove; 44-first magnetic attraction member; 45-magnetic attraction member; and 5-connecting portion.

DETAILED DESCRIPTION OF THE EMBODIMENTS

The technical solutions of embodiments of the present invention will be described below clearly and comprehensively in conjunction with accompanying drawings of the embodiments of the present invention.

With reference to FIGS. 2-17, for sake of clarity, the term "grip force" is used herein means the ability to stand firmly on the ground without tilting towards the ground, and "group" refers to any supporting surface on which an object can be replaced.

As shown in FIGS. 2-9, a multifunctional mobile phone holder includes a placing portion 1 and a supporting portion 2, where the placing portion 1 is rotationally connected to the supporting portion 2, the supporting portion 2 includes a main supporting plate 21, a left supporting plate 22 and a right supporting plate 23, the main supporting plate 21 is provided with a first main inclined surface 211 and a second main inclined surface 212, the left supporting plate 22 is provided with a left inclined surface 221, and the right supporting plate 23 is provided with a right inclined surface 231; it should be noted that the first main inclined surface 211 and the left inclined surface 221 are arranged in a parallel manner, and inclination angles thereof are kept consistent; the second main inclined surface 212 and the right inclined surface 231 are arranged in a parallel manner, and inclination angles thereof are kept consistent; when not in use, the main supporting plate 21, the left supporting plate 22 and the right supporting plate 23 are parallel to each other in pairs and close to each other, so as to reduce the floor space; when in use, the left supporting plate 22 rotates with an axis P1 perpendicular to the first main inclined surface 211 as a rotation axis, and the right supporting plate 23 rotates by a certain angle with an axis P2 perpendicular to the second main inclined surface 212 as a rotation axis, such that the main supporting plate 21, the left supporting plate 22 and the right supporting plate 23 are separated from each other two by two to form a triangular pyramid shape to support the placing portion 1, in such case, the supporting portion 2 in the shape of a triangular pyramid shape has both grip force and supporting force, and the placing portion 1 serves as a back supporting an electronic device and can be adjusted at multiple angles with the supporting portion 2 to improve the stability during use, optimize the use of components and reduce the production costs.

Figure 10:
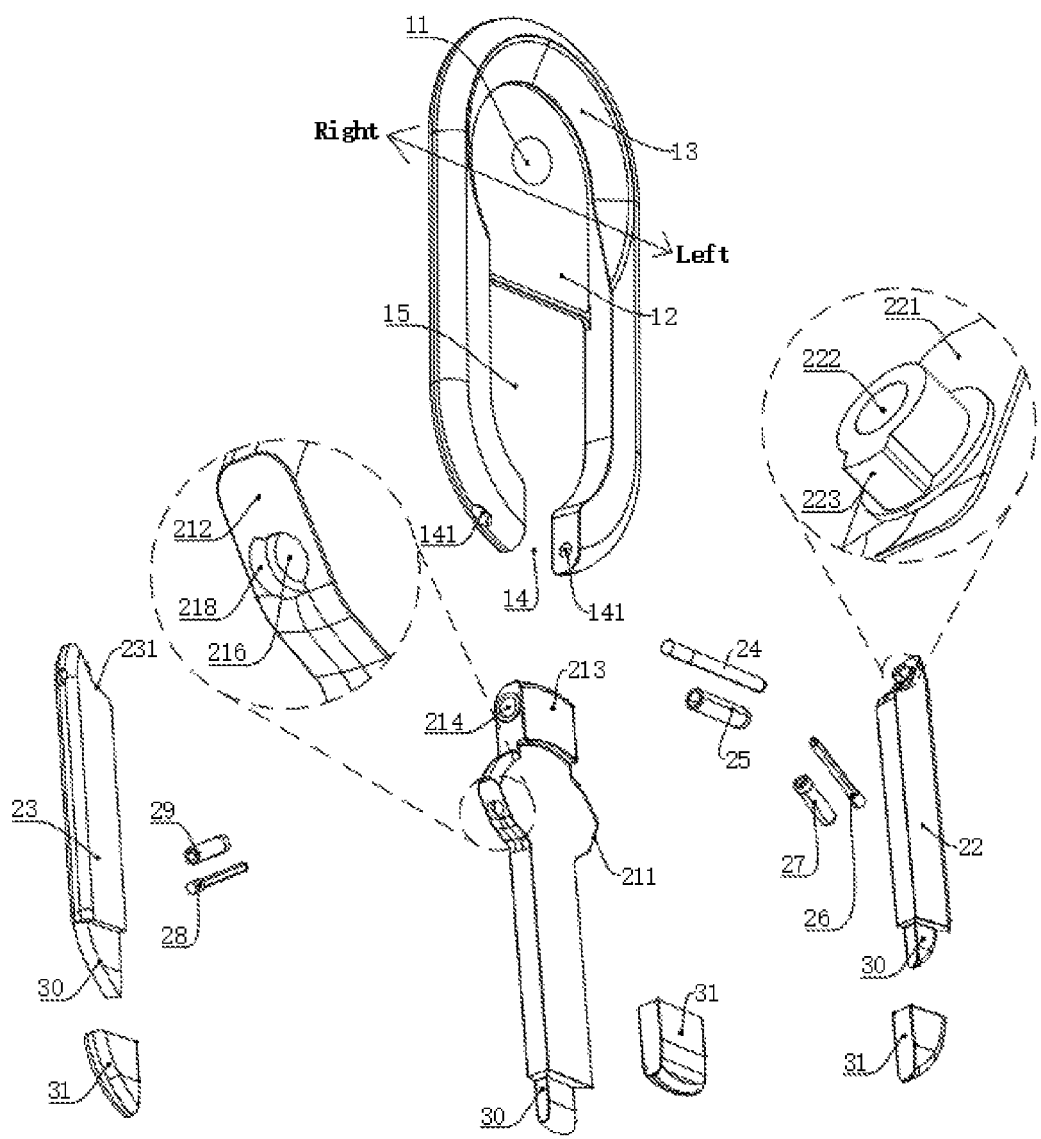
FIG. 10 is an exploded view of a holder in the present disclosure.

As shown in FIG. 10, the placing portion 1 is provided with an accommodating groove 12 formed with an internal recess, a depth of the accommodating groove 12 is configured to be consistent with a thickness of the supporting portion 2, the supporting portion 2 is rotated in a direction of the placing portion 1 and pushed into the accommodating groove 12, such that the supporting portion 2 and the placing portion 1 are folded, the overall space occupied by the holder is optimized, and the appearance of the holder becomes exquisite and compact, making the holder convenient to be stored in a pocket and to be carried during traveling, and difficult to be lost.

Specifically, the main supporting plate 21, the left supporting plate 22 and the right supporting plate 23 are each provided with a sharp corner 30 at the lower end thereof, a corresponding rubber sleeve 31 is arranged on the sharp corner 30, and the rubber sleeve is configured to increase the grip friction of the main supporting plate 21, the left supporting plate 22 and the right supporting plate 23, such that they do not easily slide on the supporting surface, and a fixation effect and anti-slip property are effectively enhanced.

Specifically, the placing portion 1 is provided with a fixing part attached to the back of the electronic device, the fixing part is provided with a magnetic attraction part 11, and the magnetic attraction part 11 enables the back of the electronic device to be stably fixed onto the placing portion 1, such that the stability of the electronic device is enhanced.

Preferably, the fixing part is provided with adhesive with an adhesive effect, and the fixing part is fixedly adhered to the back of the electronic device or the back of a protective case of the electronic device, such that a connection of the holder to the electronic device or the protective case thereof is enhanced.

Specifically, one end of the main supporting plate 21 extends to form a connecting block 213, a placement hole 14 with a size same as that of the connecting block 213 is formed on a bottom of the placing portion 1, two sides of the placement hole 14 are each provided with a third main connecting hole 141, a fourth main connecting hole 214 corresponding to the position of the third main connecting hole 141 is formed on the connecting block 213, one side of the main supporting plate 21 is provided with a main shaft 24 and a main resistance sleeve 25 that penetrate through both the third main connecting hole 141 and the fourth main connecting hole 214, the main shaft 24 plays a role in fixing the placing portion 1 and the supporting portion 2, and the main resistance sleeve 25 is sleeved on an outer periphery of the main shaft 24 to tension and provide resistance; and when the main supporting plate 21 rotates at a certain angle relative to the placing portion 1, and the electronic device is placed on the placing portion 1, the main resistance sleeve 25 prevents the placing portion 1 from rotating, so as to avoid rotation when the electronic device is pressed by hand, thus affecting the user's experience.

Specifically, a first left connecting hole 215 is formed on the first main inclined surface 211, a second left connecting hole 222 is formed on the left inclined surface 221, a left shaft 26 and a left resistance sleeve 27 are arranged between the first left connecting hole 215 and the second left connecting hole 222, and the left resistance sleeve 27 is sleeved on an outer periphery of the left shaft 26; a first right connecting hole 216 is formed on the second main inclined surface 212, a second right connecting hole 232 is formed on the right inclined surface 231, a right shaft 28 and a right resistance sleeve 29 are arranged between the first right connecting hole 216 and the second right connecting hole 232, and the right resistance sleeve 29 is sleeved on an outer periphery of the right shaft 28; and it should be noted that the left shaft 26 plays a role in rotationally connecting the left supporting plate 22 and the main supporting plate 21, the right shaft 28 plays a role in rotationally connecting the right supporting plate 23 and the main supporting plate 21, the left supporting plate 22 rotates away from or close to the main supporting plate 21 with the left shaft 26 as a rotation axis, the right supporting plate 23 rotates away from or close to the main supporting plate 21 with the right shaft 28 as a rotation axis, and the left resistance sleeve 27 and the right resistance sleeve 29 play a role in tensioning and providing resistance.

Figure 11:
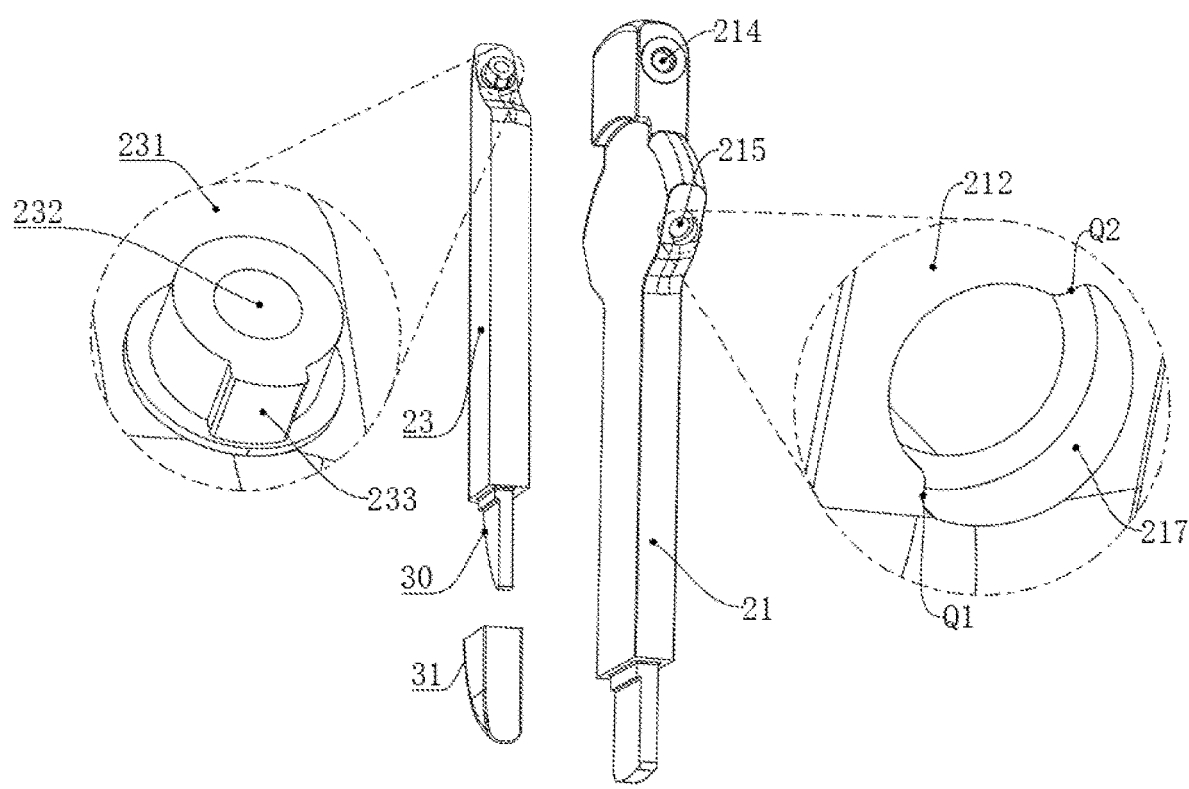
FIG. 11 is a three-dimensional structure diagram of a main supporting plate and a right supporting plate according to the present disclosure.

As shown in FIGS. 10 and 11, a left limiting block 223 is arranged on the left inclined surface 221, the first left connecting hole 215 is provided with a semicircular arc-shaped left limiting ring groove 217, and the left limiting block 223 can rotate within a range of the left limiting ring groove 217 and limit a rotation angle of the left supporting plate 22 relative to the main supporting plate 21; a right limiting block 233 is arranged on the right inclined surface 231, the first right connecting hole 216 is provided with a semicircular arc-shaped right limiting ring groove 218, and the right limiting block 233 can rotate within a range of the right limiting ring groove 218 and limit a rotation angle of the right supporting plate 23 relative to the main supporting plate 21; taking a rotation of the left supporting plate 22 relative to the main supporting plate 21 as an example, the left limiting ring groove 217 is provided with a starting point Q1 and an end point Q2, when the left limiting block 223 is located at the starting point Q1, the main supporting plate 21 and the left supporting plate 22 are parallel to each other and close together, and an intersection angle a is 0 degree; and when the left limiting block 223 rotates to the end point Q2 with the range of the left limiting ring groove 217 with the left shaft 26 as a rotation axis, the intersection angle a between the main supporting plate 21 and the left supporting plate 22 is the largest, similarly, the right supporting plate 23 also rotates by an angle a, in such case, the triangular pyramid shape formed by the main supporting plate 21, the left supporting plate 22 and the right supporting plate 23 is the most stable, and the holder will not shake during use, such that the stability of the supporting portion 2 is enhanced.

Specifically, a through hole 15 penetrating through the placing portion is formed on the placing portion 1, and a width of the through hole 15 in left and right directions is consistent with an accumulative width of the main supporting plate 21, the left supporting plate 22 and the right supporting plate 23 after they are close to one another; and when using the holder, a user can extend his hand in front of the placing portion 1 towards the through hole 15 to contact the entire supporting portion 2, and continue to impose force to enable the entire supporting portion 2 to rotate away from the accommodating groove 12 with an axis P3 as a rotation axis, such that the supporting portion 2 can be easily and conveniently rotated away from the accommodating groove 12 through the through hole 15.

Two embodiments are provided and described in detail below with respect to specific different problems:

Embodiment 1 is used to solve the problem of how to conveniently rotate the supporting portion 2 away from the accommodating groove 12:

as shown in FIG. 10, an arc-shaped inclined groove 13 is formed on the accommodating groove 12, a hand is extended to the arc-shaped inclined groove 13 from the rear of the placing portion 1 to enter the area of the accommodating groove 12 and grip the supporting portion 2, force is imposed and pushed backwards to make the entire supporting portion 2 rotated with the axis P3 as the rotation axis away from the accommodating groove 12, and the supporting portion 2 can easily and conveniently rotate away from the accommodating groove 12 by arranging the arc-shaped inclined groove 13.

Figure 12:
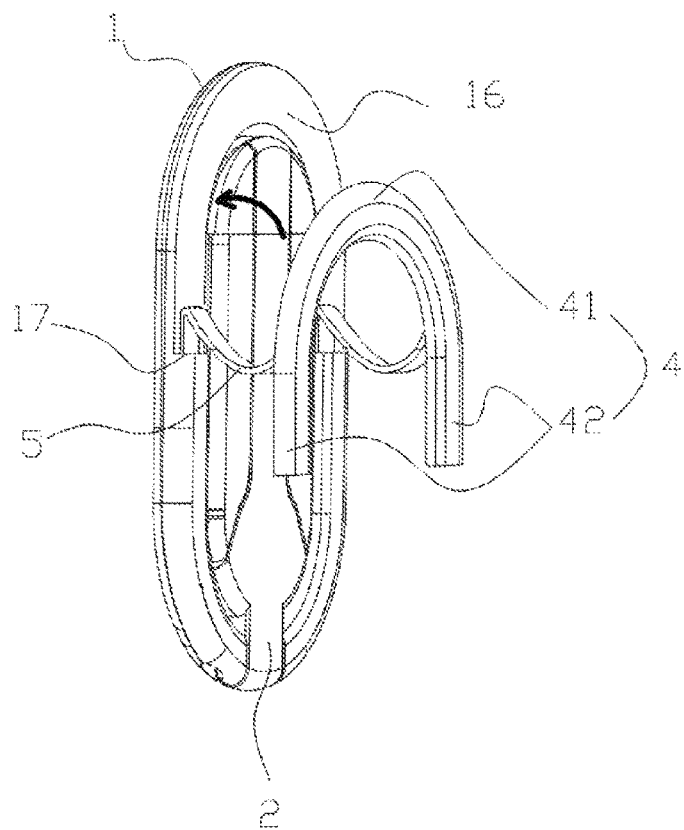
FIG. 12 is a three-dimensional structure diagram 1 when a connecting portion according to the present disclosure is unfolded.
Figure 13:
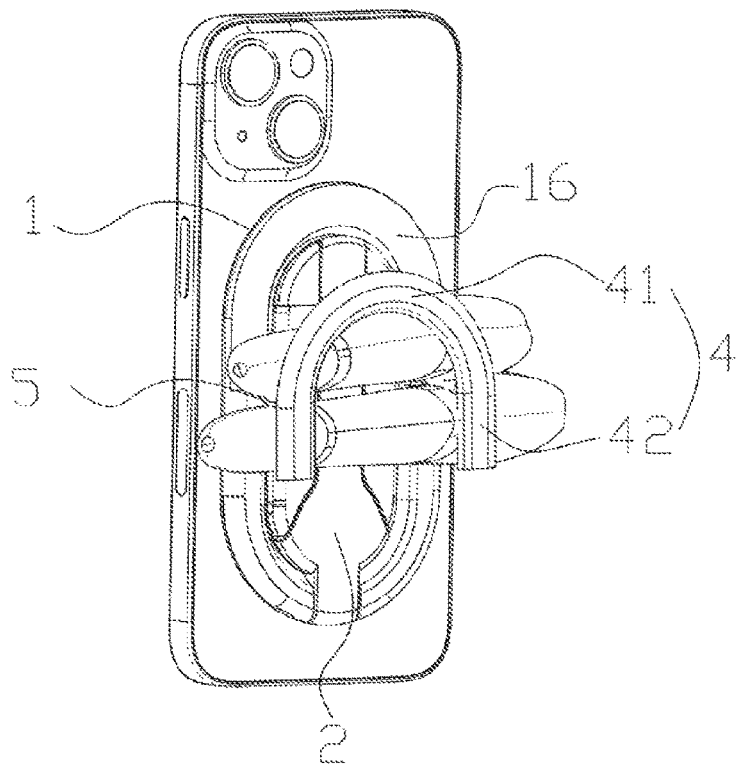
FIG. 13 is a schematic diagram of a state of use when a connecting portion according to the present disclosure is unfolded.
Figure 17:
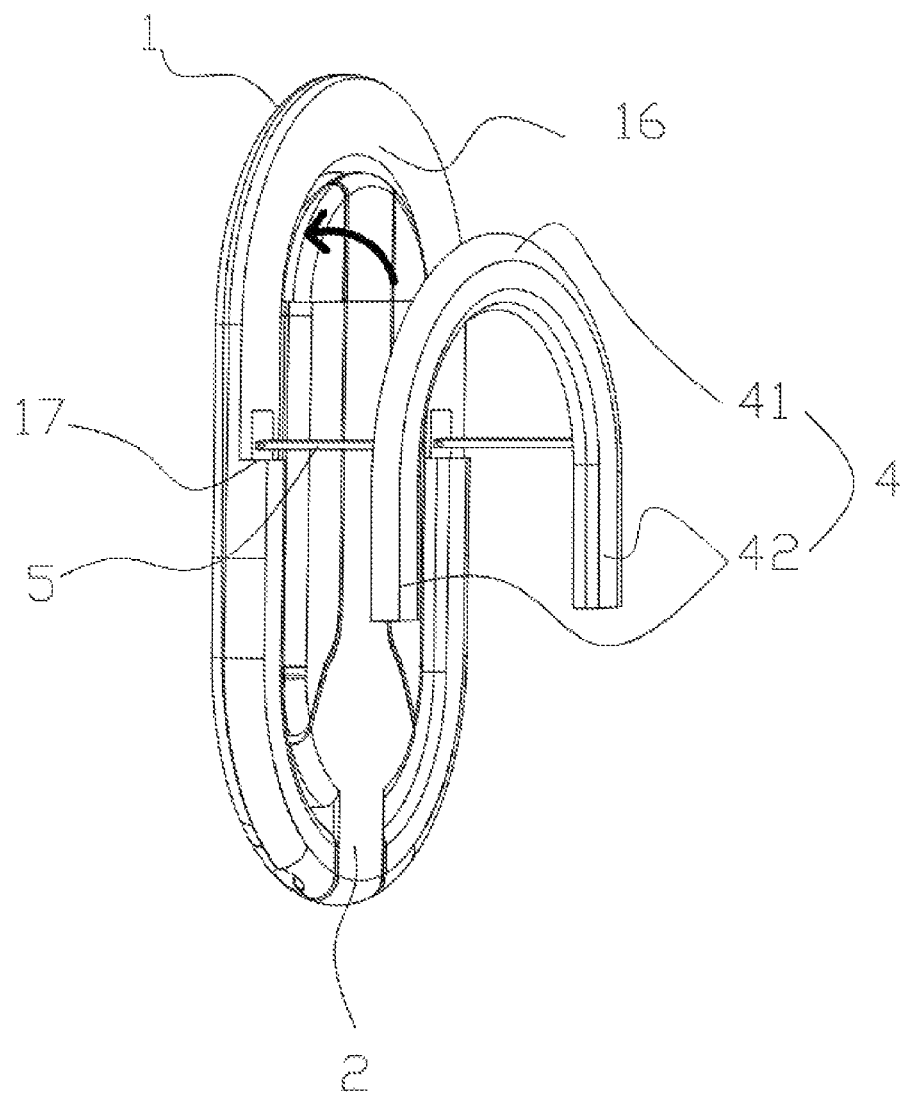
FIG. 17 is a schematic diagram when a connecting portion according to the present disclosure is hinged.

Embodiment 2 is used to solve the problem of how to conveniently grasp the holder:

as shown in FIGS. 12-17, a cover plate 4 is arranged on the placing portion 1, a connecting portion 5 is connected between the placing portion 1 and the cover plate 4, one end of the connecting portion 5 is connected to the placing portion 1, and the other end thereof is connected to the cover plate 4;

when the cover plate 4 is opened, one end of the connecting portion 5 is connected to the placing portion 1, the other end thereof is connected to the cover plate 4, in such case, the connecting portion 5 is horizontally unfolded ("horizontally" is shown in FIGS. 12 and 17, in such case, the cover plate 4 and the placing portion 1 are in vertical directions, and the connecting portion 5 is in a horizontal direction) and located between the placing portion 1 and the cover plate 4; and when using the holder, since the horizontal arrangement of the connecting portion 5, the user can pinch the middle part of the connecting portion 5 with two adjacent fingers, grasp the holder and the back of the mobile phone with the fingers to hold and grasp the holder firmly;

when the cover plate 4 is stored, the connecting portion 5 is vertically folded between the placing portion 1 and the cover plate 4, and the cover plate, the connecting portion and the placing portion are closely together, such that the overall space occupied by the holder is optimized, and the holder is easy to be stored in a pocket; and the connecting portion 5 is vertically or horizontally connected between the placing portion 1 and the cover plate 4, such that the user can grasp the holder through the connecting portion 5 to use the mobile phone, and the user can also store the holder in the pocket by folding the connecting portion 5, thereby further improving the practicability of the holder in various use scenarios.

Preferably, the number of the connecting portion 5 is two, and the connecting portions are horizontally and symmetrically arranged on the left and right sides of the opposite surface of the placing portion 1 and the cover plate 4.

Specifically, the cover plate 4 includes a cover head 41 and a cover arm 42, where the cover head 41 is of a semicircular ring-shaped structure, two ends of the cover head 41 are respectively provided with the downwardly extending cover arm 42, a connection point between the connecting portion 5 and the cover plate 4 is located between a top and a bottom of the cover plate 4, such that the connecting portion 5 and the cover plate 4 form a T-shaped structure; and when using the holder, the user can pinch the middle part of the connecting portion 5 with fingers, and the cover head 41 and the cover arm 42 are located on the back of the fingers and play a supporting role, such that the fingers are located between the holder and the cover plate 4, and the security and comfort of grasping the holder are further improved by placing the fingers between the holder and the cover plate 4.

Preferably, the connection point between the connecting portion 5 and the cover plate 4 is optionally located in the middle in a lengthwise direction of the cover plate 4.

Further, an inwardly recessed groove 43 is formed on the surface of the cover plate 4 facing the placing portion 1, where the groove 43 corresponds to the position of the connecting portion 5 being stored, and a depth of the groove 43 is greater than a thickness of the connecting portion 5; and when cover plate 4 is stored, the connecting portion 5 is stored inside the groove 43, such that the cover plate 4 is fitted with the placing portion 1, thereby further optimizing the space occupied by the holder and making the holder more compact and beautiful.

Figure 14:
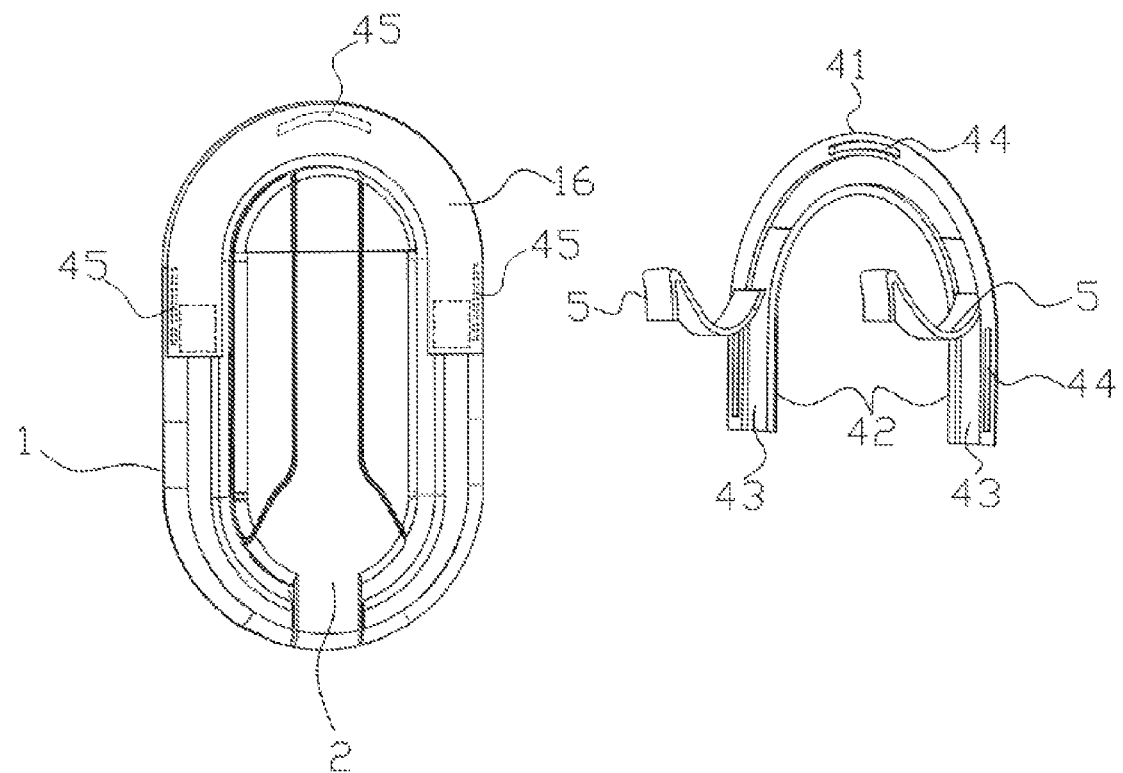
FIG. 14 is a structural schematic diagram of a cover plate and a connecting portion according to the present disclosure.
Figure 15:
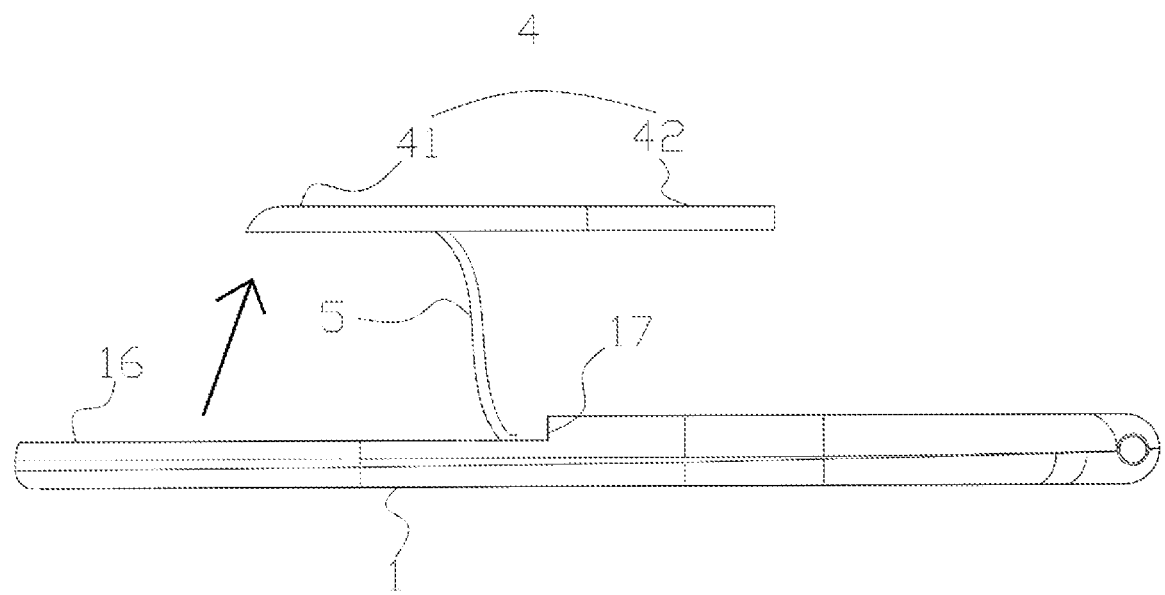
FIG. 15 is a side view when a connecting portion according to the present disclosure is unfolded.
Figure 16:
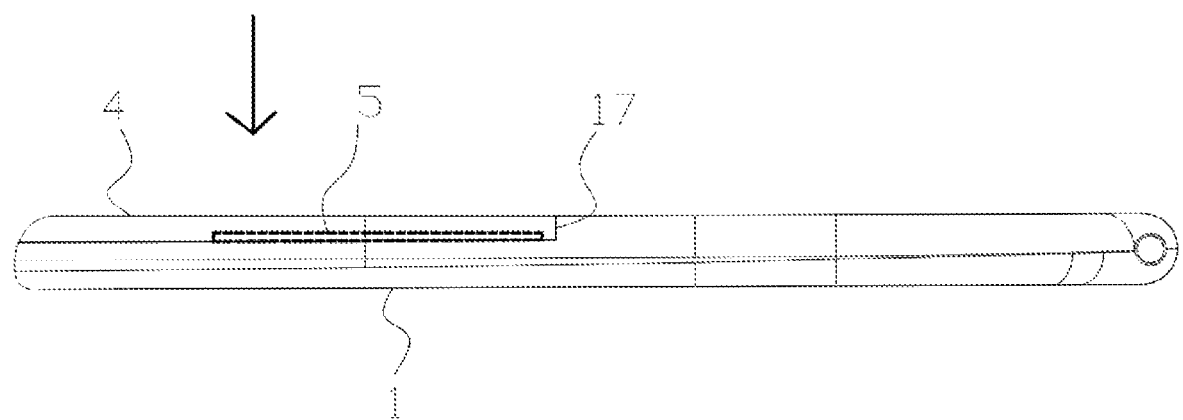
FIG. 16 is a side view when a connecting portion according to the present disclosure is folded.

More further, as shown in FIG. 14, one or more first magnetic attraction members 44 are arranged between the edge of the groove 43 and the edge of the cover plate 4, and a second magnetic attraction member 45 corresponding to the position of the first magnetic attraction member 44 is arranged on the placing portion 1; under the action of the magnetic force of the first magnetic attraction member 44 and the second magnetic attraction member 45, the cover plate 4 and the placing portion 1 are both kept in a stored state, and the cover plate 4 and the placing portion 1 are in close contact with each other when being stored; and in the stored state, as long as the cover plate 4 is slightly pulled out in an opposite direction of the placing portion 1, and after the connecting portion 5 is horizontally unfolded, the connecting portion 5 can be grasped for use, thereby improving the convenience of use of the holder.

Specifically, a placing position 16 for accommodating the cover plate 4 is arranged at the position where the placing portion 1 is in perfect fit with the cover plate 4, the placing position 16 and a lower part of the placing portion 1 form a step 17, and a thickness of the step 17 is the same as a thickness of the cover plate 4; and when the cover plate 4 is in perfect fit with the placing position 16 on the placing portion 1, free end surfaces of the cover plate 4 and the placing portion 1 are on a same vertical plane, such that the placing portion 1 and the cover plate 4 are more integrated after being in perfect fit, and the space occupied by the holder is further optimized.

It should be noted that a design position of the placing position 16 combined with the cover plate 4 in this embodiment is not limited to the position of this embodiment; and in addition, under the same effect, the placing position and the cover plate can also be arranged at any position on the edge of the opposite surface of the placing portion 1 and the cover plate.

Specifically, when the connecting portion 5 is made of soft material, two ends of the connecting portion 5 are fixedly connected to the placing portion 1 and the cover plate 4, respectively; and further, when the connecting portion 5 is made of hard material, two ends of the connecting portion 5 are respectively hinged with the placing portion 1 and the cover plate 4.

For those skilled in the art, it is apparent that the present disclosure is not limited to details of the exemplary embodiments, and the present disclosure can be implemented in other specific forms without departing from the spirit or basic features of the present disclosure. Therefore, the embodiments should be regarded as illustrative and non-restrictive no matter from which point of view. The scope of the present disclosure is defined by the appended claims rather than the above specification, and therefore, it is intended that all changes which fall within the meaning and scope of equivalency of the claims are embraced in the present disclosure. Any reference numerals in the claims should not be construed as limiting the claims to which they relate.

In addition, it should be understood that although the description is described according to implementations, each implementation does not include only one independent technical solution, the description is for clarity only, and those skilled in the art should take the description as a whole, the technical solutions in the various embodiments may be appropriately combined to form other implementations understandable by those skilled in the art.

What is claimed is:

1. A multi-functional mobile phone holder, comprising a placing portion (1) and a supporting portion (2), wherein the placing portion (1) is rotationally connected to the supporting portion (2), the supporting portion (2) comprises a main supporting plate (21), a left supporting plate (22) and a right supporting plate (23), the main supporting plate (21) is provided with a first main inclined surface (211) and a second main inclined surface (212), the left supporting plate (22) is provided with a left inclined surface (221), and the right supporting plate (23) is provided with a right inclined surface (231); the left supporting plate (22) rotates with an axis P1 perpendicular to the first main inclined surface (211) as a rotation axis, and the right supporting plate (23) rotates by a certain angle with an axis P2 perpendicular to the second main inclined surface (212) as a rotation axis, such that the main supporting plate (21), the left supporting plate (22) and the right supporting plate (23) are separated from each other two by two to support the placing portion (1);

wherein the placing portion (1) is provided with an accommodating groove (12) formed with an internal recess, and a through hole (15) penetrating through the placing portion is formed on the placing portion (1); and wherein one end of the main supporting plate (21) extends to form a connecting block (213), a placement hole (14) with a size same as that of the connecting block (213) is formed on a bottom of the placing portion (1), two sides of the placement hole (14) are each provided with a third main connecting hole (141), a fourth main connecting hole (214) corresponding to the position of the third main connecting hole (141) is formed on the connecting block (213), and one side of the main supporting plate (21) is provided with a main shaft (24) and a main resistance sleeve (25);

a first left connecting hole (215) is formed on the first main inclined surface (211), a second left connecting hole (222) is formed on the left inclined surface (221), and a left shaft (26) and a left resistance sleeve (27) are arranged between the first left connecting hole (215) and the second left connecting hole (222); and a first right connecting hole (216) is formed on the second main inclined surface (212), a second right connecting hole (232) is formed on the right inclined surface (231), and a right shaft (28) and a right resistance sleeve (29) are arranged between the first right connecting hole (216) and the second right connecting hole (232).

2. The multi-functional mobile phone holder according to claim 1, wherein a left limiting block (223) is arranged on the left inclined surface (221), and the first left connecting hole (215) is provided with a semicircular arc-shaped left limiting ring groove (217); and a right limiting block (233) is arranged on the right inclined surface (231), and the first right connecting hole (216) is provided with a semicircular arc-shaped right limiting ring groove (218).

3. The multi-functional mobile phone holder according to claim 2, wherein an arc-shaped inclined groove (13) is formed on the accommodating groove (12).

4. The multi-functional mobile phone holder according to claim 2, wherein a cover plate (4) is arranged on the placing portion (1), a connecting portion (5) is connected between the placing portion (1) and the cover plate (4), one end of the connecting portion (5) is connected to the placing portion (1), and the other end thereof is connected to the cover plate (4);

when the cover plate (4) is opened, one end of the connecting portion (5) is connected to the placing portion (1), the other end thereof is connected to the cover plate (4), in such case, the connecting portion (5) is horizontally unfolded and located between the placing portion (1) and the cover plate (4), such that the holder can be grasped more firmly; and when the cover plate (4) is stored, the connecting portion (5) is vertically folded between the placing portion (1) and the cover plate (4), and the cover plate, the connecting portion and the placing portion are closely together, such that the holder is easy to be stored.

5. The multi-functional mobile phone holder according to claim 4, wherein an inwardly recessed groove (43) is formed on the cover plate (4), wherein the groove (43) corresponds to the position of the connecting portion (5) being stored, and a depth of the groove (43) is greater than a thickness of the connecting portion (5).

6. The multi-functional mobile phone holder according to claim 5, wherein one or more first magnetic attraction members (44) are arranged between an edge of the groove (43) and an edge of the cover plate (4), and a second magnetic attraction member (45) corresponding to the position of the first magnetic attraction member (44) is arranged on the placing portion (1); and under the action of the magnetic force of the first magnetic attraction member (44) and the second magnetic attraction member (45), the cover plate (4) and the placing portion (1) are both kept in a stored state.

7. The multi-functional mobile phone holder according to claim 6, wherein a placing position (16) for accommodating the cover plate (4) is arranged at the position wherein the placing portion (1) is in perfect fit with the cover plate (4), the placing position (16) and a lower part of the placing portion (1) form a step (17), and a thickness of the step (17) is the same as a thickness of the cover plate (4).

8. The multi-functional mobile phone holder according to claim 7, wherein when the connecting portion (5) is made of soft material, two ends of the connecting portion (5) are fixedly connected to the placing portion (1) and the cover plate (4), respectively; and when the connecting portion (5) is made of hard material, two ends of the connecting portion (5) are respectively hinged with the placing portion (1) and the cover plate (4).

\* \* \* \* \*